United States Patent [19]

Kenna

[11] Patent Number: 5,260,040
[45] Date of Patent: Nov. 9, 1993

[54] EXTRACTION AND RECOVERY OF GOLD

[75] Inventor: Craig C. Kenna, Warners Bay, Australia

[73] Assignee: CRA Services Limited, Canada

[21] Appl. No.: 761,873

[22] PCT Filed: Feb. 19, 1991

[86] PCT No.: PCT/AU91/00057

§ 371 Date: Sep. 12, 1991

§ 102(e) Date: Sep. 12, 1991

[87] PCT Pub. No.: WO91/13177

PCT Pub. Date: Sep. 5, 1991

[30] Foreign Application Priority Data

Feb. 23, 1990 [AU] Australia .................. PJ8790

[51] Int. Cl.⁵ .................................................. C01G 7/00
[52] U.S. Cl. .......................................................... 423/27
[58] Field of Search .................. 423/24, 27, 29, 42, 423/41, 23, 28; 204/109; 75/736, 732, 737

[56] References Cited

U.S. PATENT DOCUMENTS

| | | | |
|---|---|---|---|
| 3,992,197 | 11/1976 | Wetzold | 75/370 |
| 4,561,947 | 12/1985 | Schulze | 204/109 |
| 4,668,289 | 5/1987 | Langer et al. | 423/27 |
| 4,731,113 | 3/1988 | Little | 423/27 |
| 4,778,519 | 10/1988 | Pesic | 423/27 |
| 4,913,730 | 4/1990 | Deschenes et al. | 75/370 |

FOREIGN PATENT DOCUMENTS

| | | |
|---|---|---|
| 52-20963 | 2/1977 | Japan . |
| 854463 | 6/1985 | South Africa . |
| 1534485 | 12/1978 | United Kingdom . |
| 2152488A | 8/1985 | United Kingdom . |
| 2181722A | 4/1987 | United Kingdom . |

*Primary Examiner*—David Brunsman
*Attorney, Agent, or Firm*—Larson and Taylor

[57] ABSTRACT

A process for the hydrometallurgical recovery of gold from gold-bearing material comprising the step of treating gold-bearing material with an acidic lixiviant solution containing thiourea and ferric ions, characterized in that the said solution also includes a complexing agent for ferric ions, whereby consumption of thiourea is significantly reduced. The complexing agent may be selected from the group consisting of di- and tri-carboxylic acids, phosphoric acid and phosphate salts, thiocyanates, fluorides, fluosilicic acid and fluosilicate salts, EDTA and EDTA salts, and mixtures thereof.

6 Claims, 3 Drawing Sheets

EXTRACTION AND RECOVERY OF GOLD

FIELD OF INVENTION

This invention relates to the extraction and recovery of gold from gold-bearing material. Such material encompasses gold bearing ores, concentrates, anodic slimes and residues, as well as gold-bearing metallic scrap, and materials previously treated by roasting, bacterial leaching, pressure leaching or other techniques required to liberate the gold from its matrix.

The invention relates to the extraction and recovery of gold from gold bearing materials, for example those above mentioned, using leaching methods such as continuous or batch stirred tank agitation, vat leaching, or the in situ techniques such as dump and heap leaching, or the in situ technique of solution mining.

BACKGROUND OF THE INVENTION

At present, the conventional cyanide leach process is used almost universally to extract gold. However, the growing concern over safety and environmental hazards associated with the use of cyanide combined with the limited use of the process for treatment of problematic gold ores (e.g., refractory sulfide ores, carbonaceous ores, ores containing significant amounts of cyanocides) requires development of an economically viable, alternative leach process.

Gold is readily dissolved in acidified solutions containing thiourea, using manganese dioxide, hydrogen peroxide or ferric ions as the oxidant D. W. Bilston, R. N. Millet and J. T. Woodcock (1987) Proc. Confer. "Research and Development in Extractive Metallurgy" (Aus. I.M.M. Melbourne) pp. 19-28]. However, this gold dissolution process has found little application in the gold industry. The main drawback has been the excessive oxidative degradation of thiourea which occurs in the presence of the above mentioned oxidants. The relevant chemical reactions can be written in two stages involving initial oxidation to formamidine disulfide(1), followed by further irreversible decomposition to sulfur, cyanamide and thiourea(2).

$$Fe^{3+} + tu \rightarrow \tfrac{1}{2}(tu)_2^{2+} + Fe^{2+} \quad (1)$$

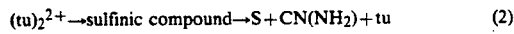

$$(tu)_2^{2+} \rightarrow \text{sulfinic compound} \rightarrow S + CN(NH_2) + tu \quad (2)$$

where tu = thiourea
and $(tu)_2^{2+}$ = formamidine disulfide.

Reaction (1) is much faster than reaction (2) and was considered as the dominant reaction in determining the relative consumption of thiourea. Furthermore, the rapid consumption of thiourea during the leach process is often associated with passivation of gold in the feed material, and hence low gold recoveries. Consequently, in the past, the thiourea leaching process has proved very unattractive in comparison with the universally accepted cyanidation process.

In recent work it has been shown that the use of sulphur dioxide in conjunction with thiourea significantly reduces reagent loss through oxidative degradation (R. G. Schulze (1984) J. Metals 36 (6) pp. 62-65). However, the lowering of thiourea consumption by using sulphur dioxide has not always been achieved in practice D. W. Bilston, R. N. Millet and J. T. Woodcock (1987) Proc. Conf. "Research and Development in Extractive Metallurgy" (Aus. I.M.M. Melbourne) pp. 19-28. The same workers have also patented the use of a substituted thiourea, i.e. ethylene thiourea. This particular derivative is more stable to oxidation and exhibits a far greater resistance to oxidative degradation than thiourea R. G. Schulze (1983) German Patent 3347165]. However, the cost of ethylene thiourea is too high to be considered as an economic alternative.

SUMMARY OF THE INVENTION

The present invention is based on the discovery that the oxidative degradation of thiourea by $Fe^{3+}$ is markedly reduced by the use of chemical reagents which have the ability to complex $Fe^{3+}$ in acidic solutions.

The invention accordingly provides a process for the hydrometallurgical recovery of gold from gold-bearing material comprising the step of treating gold bearing material with an acidic lixiviant solution containing thiourea and ferric ions, characterised in that the said solution also includes a complexing agent for ferric ions.

The oxidising power or strength of $Fe^{3+}$ is reduced to an extent where gold dissolution still occurs at an appreciable rate and the oxidative degradation of thiourea by $Fe^{3+}$ is markedly reduced.

Gold in solution as the $Au(thiourea)^{1+}$ species, in the presence of $Fe^{3+}$ and these chemical reagents, can be recovered using known techniques, e.g. absorption on activated carbon or resins; cementation with iron or aluminium; electrowon using porous carbon electrodes; reduced using hydrogen; or solvent extracted. Thus the invention extends to methods of extracting and recovering gold from gold-bearing material.

COMPARISON WITH THE PRIOR ART

The present invention differs from the prior art in this field since the essence of the present invention involves the deliberate complexation of $Fe^{3+}$, with the aim to lower the oxidising power of $Fe^{3+}$, which results in a marked reduction in the oxidative loss of thiourea. The essence of other patents in this field is described as follows.

GB 2 152 488 R. Schulze (SKW Trostberg)

Relates to the use of cyclic derivatives of thiourea as complexants for gold. The relevant cyclic thioureas are ethylene thiourea and propylene thiourea. The cyclic thioureas exhibit greater resistance to oxidative degradation compared to thiourea, whilst still allowing satisfactory gold complexation and gold leaching kinetics.

U.S. Pat. No. 4,561,947 R. Schulze (SKW Trostberg)

Relates to the use of $SO_2$, sulfur dioxide; (or other compounds that provide a source of $SO_2$, such as sulfites, hydrogen sulfites, pyrosulfites and the like); as a reductant for regenerating oxidised thiourea, (i.e. formamidine disulfide). In the leach process, $SO_2$ is used in conjunction with thiourea and an oxidant, (i.e. usually $Fe^{3+}$), to control the leach potential at a desired value where satisfactory precious metal leaching rates are achieved and thiourea degradation is minimised. In this invention, the leach potential is continuously controlled by the use of $SO_2$ which one would expect to first act by reducing a majority of the $Fe^{3+}$ ion that that is present to $Fe^{2+}$ ion. The leach potential value will determine the extent of the reduction of $Fe^{3+}$ to $Fe^{2+}$. Due to the chemistry of this invention, the predominant oxidant that exists under typical leach conditions is formamidine disulfide. The complexation of $Fe^{3+}$ is not an issue in this invention.

GB 2 181 722 R. H. Little

Relates to the use of thiourea in conjunction with urea and potassium lignin sulfonate for the extraction and recovery of precious metals. The role of these compounds in the thiourea leaching reaction is unclear. However, these compounds may effect the recovery of precious metals from thiourea containing solutions by co-adsorbing onto activated carbon and increasing the cation exchange properties of the carbon, and thus increasing the efficiency of the recovery of the precious metal-thiourea complexes using activated carbon. Urea and potassium lignin sulfonate do not form any significant complexes with ferric ions and therefore this invention has no similarities with the present invention.

S. Afr. ZA 85/4463 B. K. Loveday et. al. (Anglo American Corp. of Sth. Afr.)

Relates to in situ recovery of gold from the fines on a footwall and in the fissures and cracks therein by passing a solution capable of solubilising the gold across the footwall. An acid solution containing 0.2-1.0 g/l thiourea and optionally 0.75 g/l $Fe^{3+}$ and 1.3 g/l $Na_2SO_3$ was applied for leaching of gold. The sprayed on solution was collected in a sump for recirculation. Dissolved gold was recovered by passing the loaded solution through a column of activated carbon. This patent is concerned with a leaching technique rather than any specific novel leaching chemistry.

DETAILED DESCRIPTION OF THE INVENTION

In simple terms, to leach gold in the presence of thiourea, a leach potential in excess of 380 mv vs. N.H.E. is required. However, a leach potential above 420 mV vs. N.H.E. will also result in the oxidation of thiourea. The oxidation potential of uncomplexed $Fe^{3+}$ ion is 770 mv vs. N.H.E.. As expected, both gold and thiourea will oxidise in the presence of uncomplexed $Fe^{3+}$. By complexing $Fe^{3+}$, the oxidising potential of $Fe^{3+}$ can be reduced well below 770 mV vs. N.H.E.. The oxidation of gold still occurs at a satisfactory rate, whilst the oxidative loss of thiourea is markedly reduced. As a practical matter, it is preferred to operate at an oxidising potential between 390 and 500 mV vs. N.H.E.

The complexation of $Fe^{3+}$ in acid solution, say pH<7, can be achieved by a number of compounds. The $Fe^{3+}$ complexing reagents can be added as commercially available salts or they can be synthesised as a crude product, (typically a mixture of $Fe^{3+}$ complexing reagents. For example, the crude product could be made chemically; e.g. by oxidation of cellulosic material to form a complex mixture of polyols, hydroxycarboxylic acids and carboxylic acids which can provide a complexing solution meeting the requirements of this invention, or the crude product can be made biologically; e.g. by using microorganisms such as the fungi *Aspergillus niger* to produce carboxylic acids, such as citric acid, that complex $Fe^{3+}$.

A list of some relevant $Fe^{3+}$ complexing reagents is given in table 1.

Preferred complexing reagents are compounds which can form ferric complexes having a stability constant of log K greater than 1, and preferably greater than 2.0.

Convenient compilations providing stability constants of many complexing agents for iron are Martell and Calvin, "Chemistry of the Metal Chelate Compounds", U.S. copyright 1952, and "Stability Constants of Metal-Ion Complexes," supplement No. 1, Special Publication No. 25, published by The Chemical Society, U.S. copyright 1971.

The general leach conditions for the "modified" $Fe^{3+}$/thiourea gold leaching system (i.e. using complexed $Fe^{3+}$) are summarised in Table 2. The range of conditions listed in Table 2 covers the use of all the $Fe^{3+}$ complexants given in Table 1.

BRIEF DESCRIPTION OF THE DRAWINGS

A comparison of the rate of reaction between $Fe^{3+}$ and thiourea in the presence and absence of a $Fe^{3+}$ complexant (i.e., 0.05M oxalic acid), is illustrated in FIG. 1. These data were generated by reaction of 0.05M thiourea with 0.01M $Fe^{3+}$ in 0.1M $H_2SO_4$ at 25° C. A value of 100% relative thiourea consumption was taken as the point where all of the $Fe^{3+}$ ion had been reduced to $Fe^{2+}$ ion.

It is clear that the reduction in the oxidative strength of $Fe^{3+}$ by complexation with oxalic acid has been effective in lowering the consumption of thiourea. However, the complexation of $Fe^{3+}$ by oxalic acid, while lowering the consumption of thiourea, does not have any detrimental effect on the gold leaching reaction. This is illustrated in FIG. 2 where the dissolution of a rotating gold disc electrode was examined

After 20 hours, the rate of gold dissolution was markedly reduced, (i.e. by approximately 73%) and the gold surface had a dark brown appearance which is indicative of some form of passivation. In contrast, the rate of gold dissolution in the presence of oxalic acid exhibited a far more gradual decrease with increasing solution age. For example, after 960 hours (i.e. 40 days), the rate of gold dissolution had decreased by only 40%. The gold surface also maintained a bright lustrous appearance, showing no evidence of passivation.

The "modified" $Fe^{3+}$/thiourea gold leaching system was also applied to a column leach experiment which was aimed at simulating a heap leaching operation of a gold ore. The conditions are summarised below:

| General Column Leach Conditions | |
|---|---|
| Ore type | Refractory, low grade pyritic ore (ca. 7 kg grading 1.2 ppm gold) |
| Ore pre-treatment | A biological "heap leaching" simulation was carried out on the ore packed in the column. A target of ca. >80% pyrite oxidation was set prior to any attempts at gold leaching. |
| Gold Leaching (at ambient temp) | The ore was initially leached with a sulphuric acid solution containing oxalate to stabilize the $Fe^{3+}$ concentration. Once the $Fe^{3+}$ concentration was stabilized, thiourea was added to the leachant solution. |
| Gold Leachant | $Fe^{3+}$ ca. 0.005M<br>oxalic acid 0.056M<br>$H_2SO_4$ 0.100M<br>thiourea 0.065M |
| Percolation rate | ca. 32 ml/hour (average over 32 |

-continued

General Column Leach Conditions days)

Figure 1:
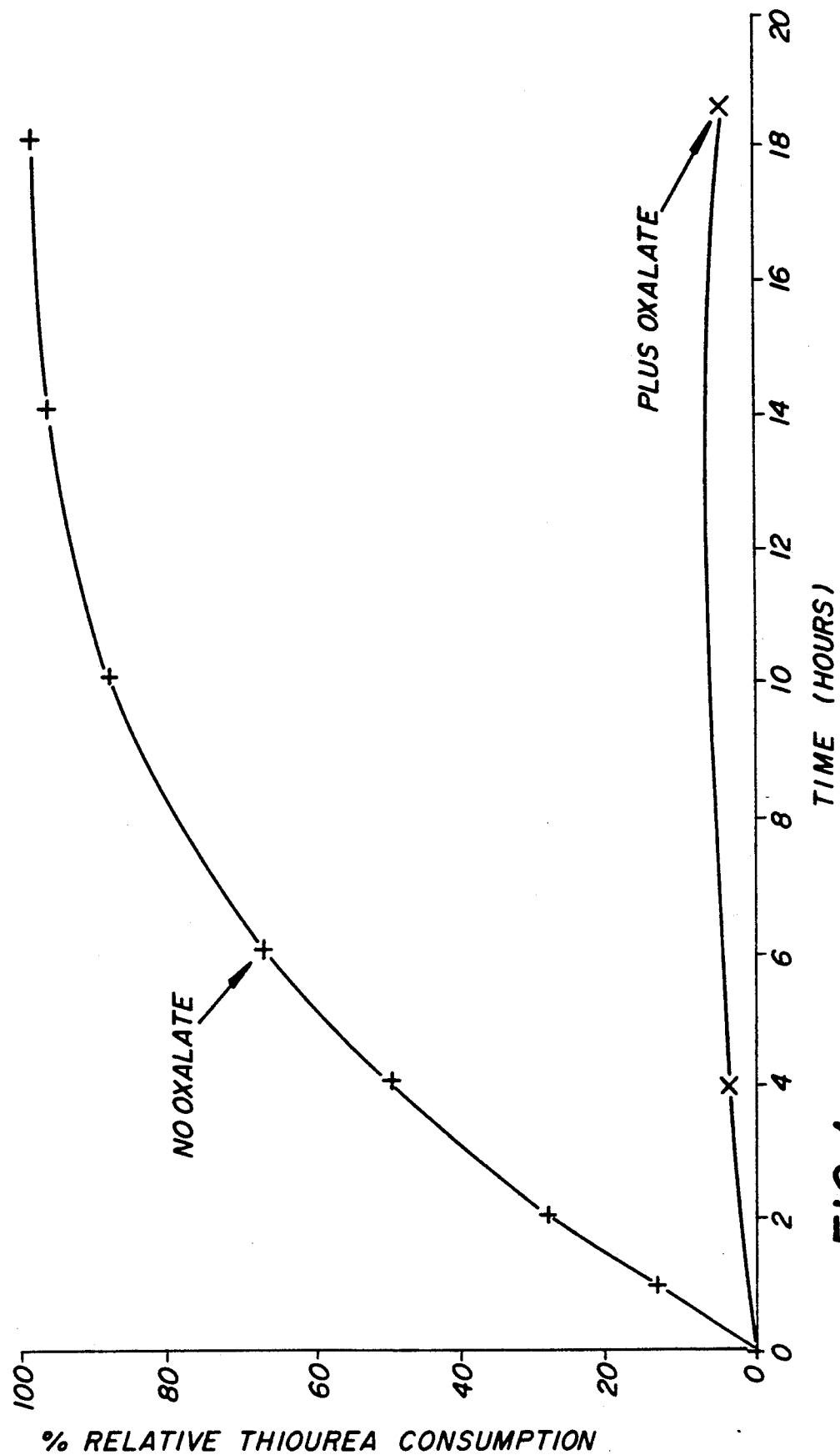
Figure 2:
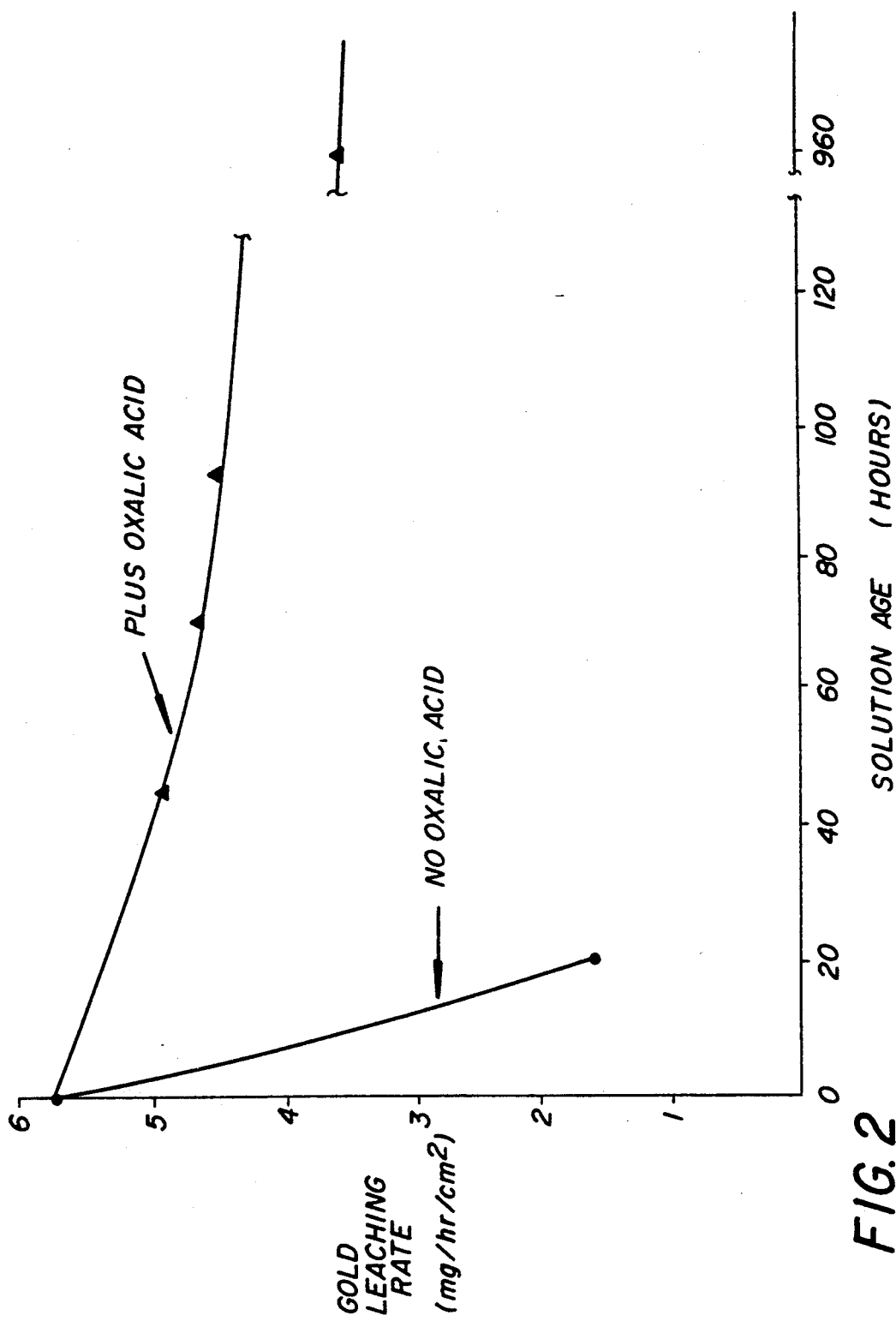
FIG. 2 illustrates the effect of 0.05M oxalic acid and solution age on the dissolution of a gold rotating disc electrode. The initial leach solution contained 0.005M $Fe^{3+}$ and 0.05M thiourea (0.1M sulfuric acid background, 25° C.). In the absence of oxalic acid, the rate of gold dissolution steadily decreased as the solution age increased. A plot of gold extraction vs. number of days is given in FIG. 3.
Figure 3:
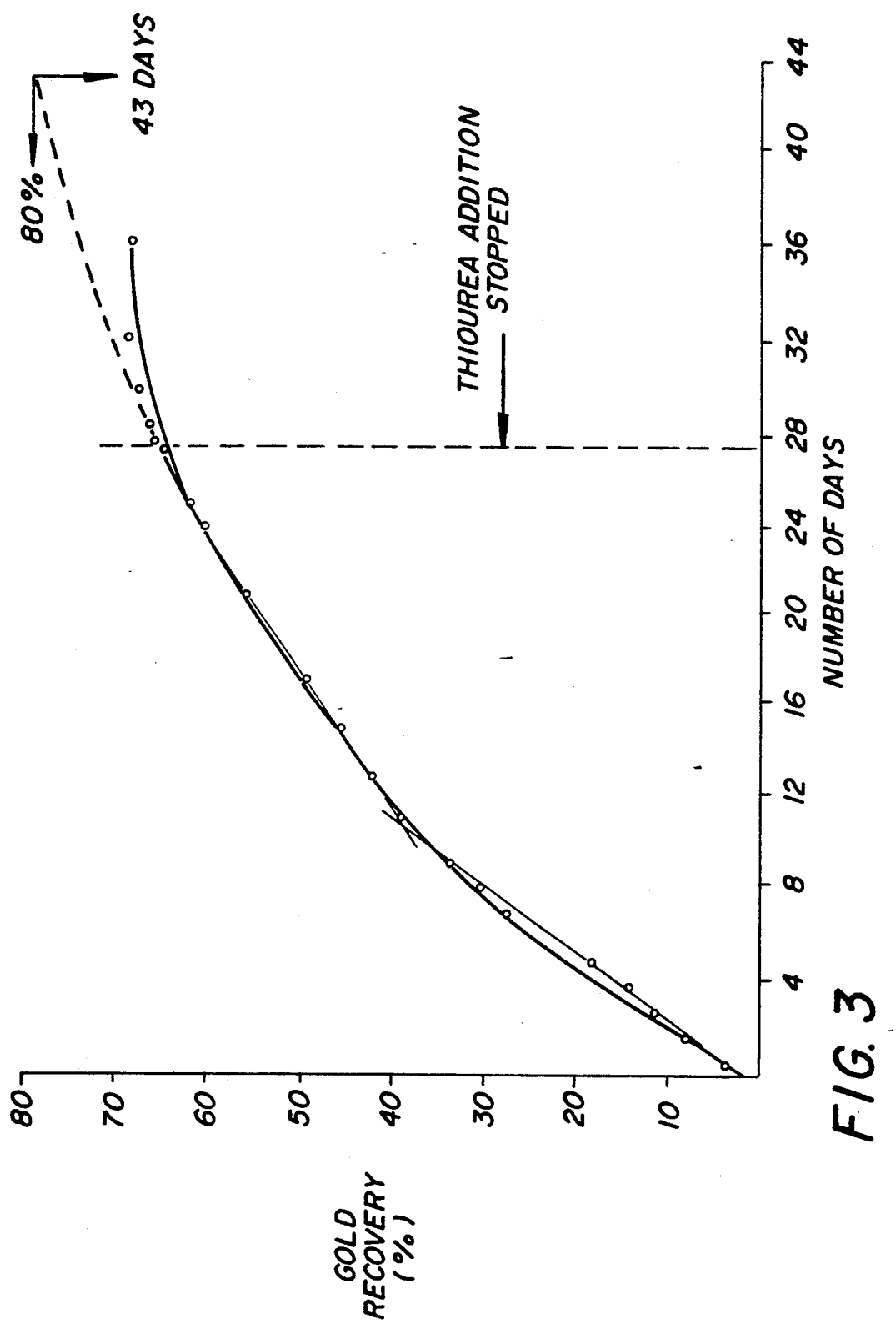

The column leaching results are summarised in Table 3. A plot of gold extraction (%) vs. the number of days is given in FIG. 3. Extrapolation from day no. 27 (i.e. where thiourea addition was ceased), shows that ca. 80% recovery can be expected after ca. 43 days if thiourea addition was continued throughout.

In summary, the results are extremely encouraging with respect to gold recovery, leaching kinetics, and thiourea consumption. This technology also creates new possibilities for treating low grade gold ores which are either inherently acidic or require an acidic pretreatment step such as biological oxidation. The application of alkaline cyanidation under these circumstances is limited due to the need for expensive and most likely ineffective neutralisation, and more than likely high cyanide consumption.

Recovery of gold from the modified acid-thiourea leaching systems was achieved by cementation of gold into iron powder. However other techniques as described by Deschnes (G. Deschnes (1986) C.I.M. Bulletin, 79 pp. 76-83.), such as absorption on carbon, electrowinning, solvent extraction, hydrogen reduction or cementation on lead powder are equally applicable. In a typical experiment, iron powder was added to a solution containing 100 ppm $Au(tu)^{3+}$, 0.066M thiourea, 0.1M sulphuric acid and 0.05M oxalic acid. Approximately 90% of the gold in solution was cemented out after 30 minutes.

TABLE 1

RELEVANT ACID-STABLE COMPLEXING AGENTS FOR $Fe^{3+}$ WHICH ARE APPLICABLE TO THE "MODIFIED" $Fe^{3+}$/THIOUREA GOLD LEACHING SYSTEM

| General Type | Examples |
| --- | --- |
| carboxylic acids di- and tri-) | oxalic acid and oxalate salts, citric acid and citrate salts, tartaric acid and tartrate salts, gluconic acid and gluconate salts. |
| phosphate based reagents | phosphoric acid and phosphate salts, ortho-phosphate salts, pyro-phosphate salts, poly-phosphate salts. |
| thiocyanate | ammonium thiocyanate sodium thiocyanate |
| fluorides | hydrofluoric acid sodium fluoride |
| fluorosilicate | fluorosilicic acid fluorosilicate salts |
| EDTA | ethylene diamine tetra acetic acid, EDTA salts. |

TABLE 2

GENERAL CONDITIONS FOR THE "MODIFIED" FERRIC/THIOUREA GOLD LEACHING SYSTEM

| VARIABLE | CONDITIONS |
| --- | --- |
| Fe | 0.0025 to 0.1M |
| Thiourea | 0.005 to 0.4M |
| | preferably 0.02 to 0.4M |
| pH | 0.5 to 4.5 |
| Potential | 350 to 700 mV vs NHE (Normal Hydrogen Electrode) |
| $Fe^{3+}$ complexants | 0.01 to 1.0M |
| | preferably 0.01 to 0.2M |
| Temperature | 10 to 90° C. |

TABLE 3

COLUMN LEACH TEST RESULTS USING THE "MODIFIED" FERRIC-THIOUREA LEACH SYSTEM.

| NUMBER OF DAYS | % GOLD EXTRACTION |
| --- | --- |
| 5 | 18.0 |
| 10 | 36.1 |
| 15 | 45.7 |
| 22 | 57.9 |
| 32 | 68.7 |

NB:
1. After 27 days, thiourea addition was stopped
2. % thiourea recovered after 32 days = 98%

It will be clearly understood that the invention in its general aspects is not limited to the specific details referred to hereinabove.

I claim:

1. A process for the hydrometallurgical recovery of gold from gold-bearing material wherein a gold-bearing material is treated with an acidic lixiviant solution containing thiourea and ferric ion to dissolve gold from said gold-bearing material, the improvement comprising including in the lixiviant solution used in said dissolution step a complexing agent for ferric ions.

2. A process according to claim 1, which the complexing agent is selected from the group consisting of di- and tri-carboxylic acids, phosphoric acid and phosphate salts, thiocyanates, fluorides, fluorosilic acid and fluorosilicate salts, EDTA and EDTA salts, and mixtures thereof.

3. A process according to claim 1 or claim 2, in which the treatment is carried out a temperature within the range 10° to 90° C., the lixiviant solution has a pH in the range 0.5 to 4.5, contains 0.0025 to 0.1M $Fe^{3+}$, 0.005 to 0.4M thiourea, and 0.01 to 1.0M $Fe^{3+}$ complexant, and has a leach potential in the range 350 to 700 mV vs Normal Hydrogen Electrode.

4. A process according to claim 3 in which the leach potential is in the range 390 to 500 mV vs Normal Hydrogen Electrode.

5. A process according to claim 1 in which the complexant forms ferric complexes having a stability constant of log K greater than 1.

6. A process according to claim 5, in which the complexant comprises oxalic acid.

* * * * *

UNITED STATES PATENT AND TRADEMARK OFFICE
CERTIFICATE OF CORRECTION

PATENT NO. : 5,260,040
DATED : November 9, 1993
INVENTOR(S) : KENNA

It is certified that error appears in the above-identified patent and that said Letters Patent is hereby corrected as shown below:

Title Page: Item [73], change the Assignee from "CRA Services Limited, Canada" to --CRA Services Limited, Australia--.

Signed and Sealed this

Twenty-eight Day of February, 1995

Attest:

BRUCE LEHMAN

Attesting Officer

Commissioner of Patents and Trademarks